April 27, 1926.
A. ROSENTHAL
CORN HUSKER
Filed Feb. 23, 1926
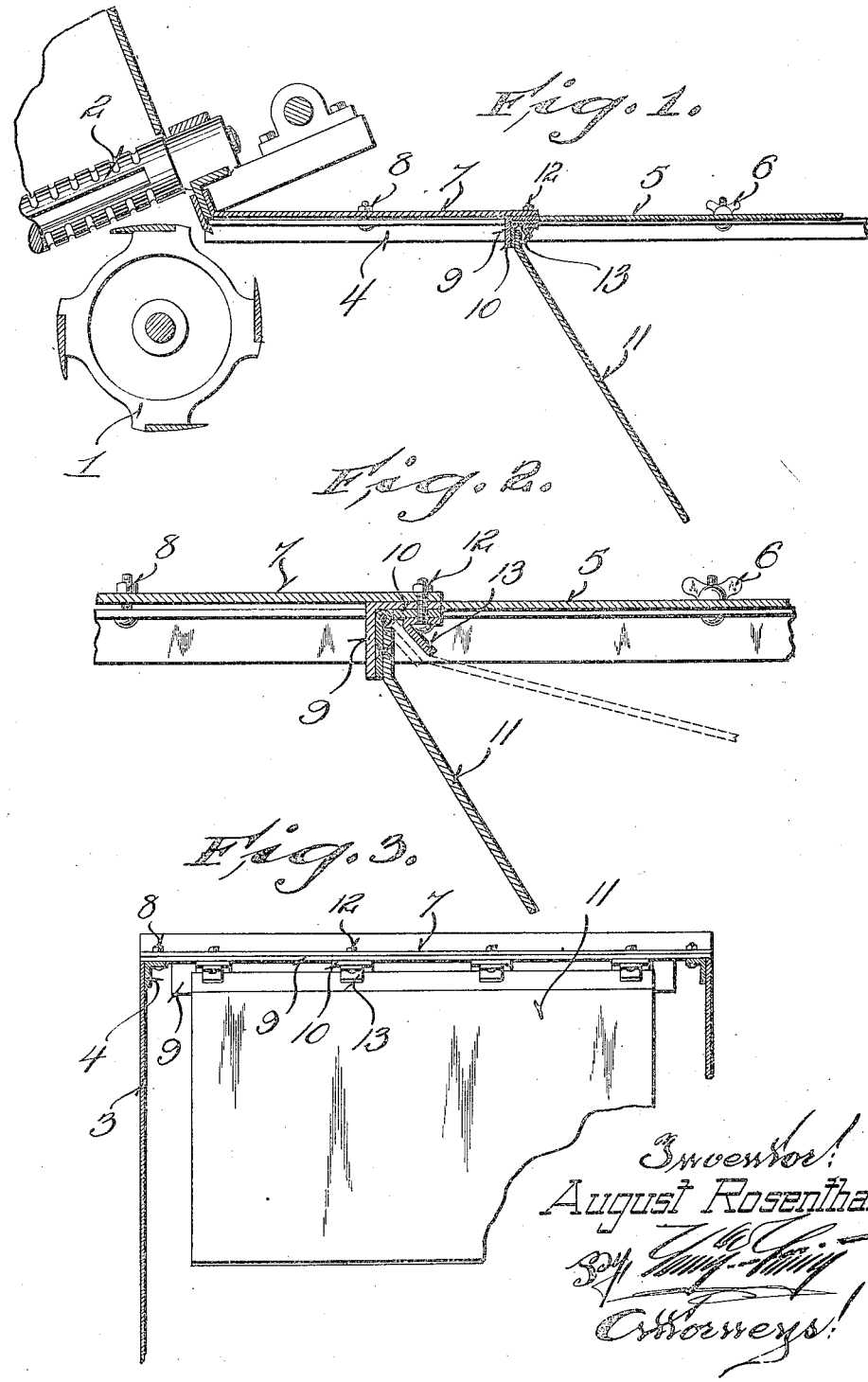
Inventor
August Rosenthal Patented Apr. 27, 1926.

1,582,542

UNITED STATES PATENT OFFICE.

AUGUST ROSENTHAL, OF WEST ALLIS, WISCONSIN, ASSIGNOR TO ROSENTHAL MANUFACTURING CO., OF WEST ALLIS, WISCONSIN.

CORN HUSKER.

Application filed February 23, 1926. Serial No. 90,060.

*To all whom it may concern:*

Be it known that I, AUGUST ROSENTHAL, a citizen of the United States, and resident of West Allis, in the county of Milwaukee and State of Wisconsin, have invented certain new and useful Improvements in Corn Huskers; and I do hereby declare that the following is a full, clear, and exact description thereof.

This invention relates to corn huskers.

This invention is an improvement over that disclosed in my prior Patents No. 1,531,758 and 1,531,759 for corn huskers issued March 31, 1925.

In corn huskers of the ordinary type disclosed in my prior patents, a revolving cutter is provided beneath the husking rolls and such cutter severs the stalks and other material and thus transforms the stalks into corn fodder. This material is delivered into the body of the machine and is drawn therefrom by a suitable blower. It frequently happens in machines of this type that clogging occurs in the main casing or body of the machine, and the operator has to remove a portion of the body and insert his hand to clear the machine. It is the usual practice to perform this operation while the machine is running, and obviously, a great danger lies in the proximity of the revolving cutter to the operator's hands. It is apparent that if the machine were stopped each time this clearing had to be accomplished that a great loss of time would result, and in addition to this, even the then stationary cutter would present its knives in a hazardous fashion adjacent the operator's hands.

This invention overcomes the defects noted above and permits the ready cleaning or freeing of the machine while it is in operation, and also guards the operator's hands from contact with the revolving cutter and makes it impossible for him to become injured by such cutter.

Further objects of this invention are to provide a shield which is positioned within the main casing or body of the machine and which is free to move within a limited field so that the shield normally moves out of the way of the material and does not obstruct the free passage of corn fodder thereby, but nevertheless, swings into shielding position whenever the operator attempts to shove his arm or hand towards the cutter, thus automatically guarding against damage while permitting free cleaning on the machine.

An embodiment of the invention is shown in the accompanying drawings, in which:

Figure 1 is a diagrammatic fragmentary view of a husking machine showing the shield in position.

Figure 2 is an enlarged detailed view of the shield.

Figure 3 is a face view of the shield.

Referring to the drawings, it will be seen that a rotary cutter 1 is positioned immediately below the husking rolls 2 and that this cutter is located within the main casing or body 3 of the machine. This main casing carries angle irons 4 adjacent its upper edges with the flanges of the angle irons projecting inwardly as shown in all three figures of the drawings. A readily removable plate 5 is secured to these angle irons by means of thumb nuts 6, preferably one thumb nut being provided on each side edge of the plate 5. This plate 5 does not extend the full length of the casing, but is supplemented by means of a second plate 7 which is securely attached by means of bolts 8 to the angle irons 4 adjacent the end of the plate 5. A relatively large transverse angle iron 9 is bolted to the machine as shown in Figure 2, and is positioned adjacent the end of the plates 5 and 7. This angle iron 9 carries a hinge whose stationary portion 10 is bolted thereto and whose movable portion is riveted or bolted to a movable shield or plate 11. The attaching bolts 12 for the angle iron 9 also hold angular stops 13 which limit the rearward motion of the shield 11 as shown in dotted lines in Figure 2. The downwardly extending portion of angle iron 9 limit the forward motion of the shield 11 in the ordinary operation of the machine. The corn fodder may become temporarily clogged or packed in the body portion or casing of the machine. When this occurs, the operator quickly removes the plate 5 without stopping the machine and inserts his arm into the body or casing thereof and frees the corn fodder. If he attempts to reach towards the cutter, the shield prevents such action and permits only a limited extension of his arm. Even if he should rock the shield downwardly into the full line position shown in Figures 1 and 2, he would still be unable to reach the cutter, the machine.

It is to be noted that the auxiliary plate 7 may be removed, but under these conditions, it is necessary to employ a wrench or other tool to loosen the numerous bolts 8. This, of course, amounts to a partial dismantling of the machine and is not possible in the ordinary operation of the apparatus. Consequently the only point of access to the interior of the machine is by way of the removable plate 5, and as stated, the operator is at all times prevented from damaging his hand when his arm is inserted in this portion of the machine.

It will thus be seen that a very simple guiding means has been provided for huskers which fully and effectively protects the hand of the operator from damage although he may free the corn fodder while the machine is in operation.

It will be seen further that this guard plate does not obstruct the free normal flow of corn fodder through the body of the machine, but moves out of the way into an unobstructing position.

Although the invention has been described in considerable detail, such description is intended as illustrative rather than limiting as the invention may be variously embodied and as the scope of such invention is to be determined as claimed.

I claim:

1. In a husking and cutting machine, the combination of husking rolls, a rotary cutter mounted below said rolls, a casing enclosing said cutter and through which the cut material is adapted to pass, a removable plate carried by said casing and affording access to said casing, and a guard located within said casing between the removable plate and the cutter.

2. In a husking and cutting machine, the of a movable plate pivoted adjacent its upper end to said casing.

3. In a husking and cutting machine, the combination of husking rolls, a rotary cutter mounted below said rolls, a casing enclosing said cutter and through which the cut material is adapted to pass, a removable plate carried by the rear portion of said casing and affording access to said casing, a transverse supporting member forming a portion of said casing and located adjacent the forward end of said plate, a pivoted guard plate carried by said transverse member and adapted to swing downwardly towards said cutter or upwardly towards said removable plate, and stops for limiting the motion of said guard plate.

4. In a husking and cutting machine, the combination of husking rolls, a rotary cutter mounted below said rolls, a casing enclosing said cutter and through which the cut material is adapted to pass, said casing having angle irons adjacent its upper edges, a stationary plate carried by said angle irons and closing the top of said casing adjacent said cutter, a removable plate carried by said angle irons and closing the upper portion of said casing at a point remote from said cutter, a transverse angle iron carried by said casing and located adjacent the forward edge of said removable plate, a hinge member carried by said transverse angle iron, a guard plate carried by said hinge member and extending into said casing, and stops for limiting the swinging motion of said guard plate.

In testimony that I claim the foregoing I have hereunto set my hand at Milwaukee, in the county of Milwaukee and State of Wisconsin.

AUGUST ROSENTHAL.